Patented Nov. 21, 1922.

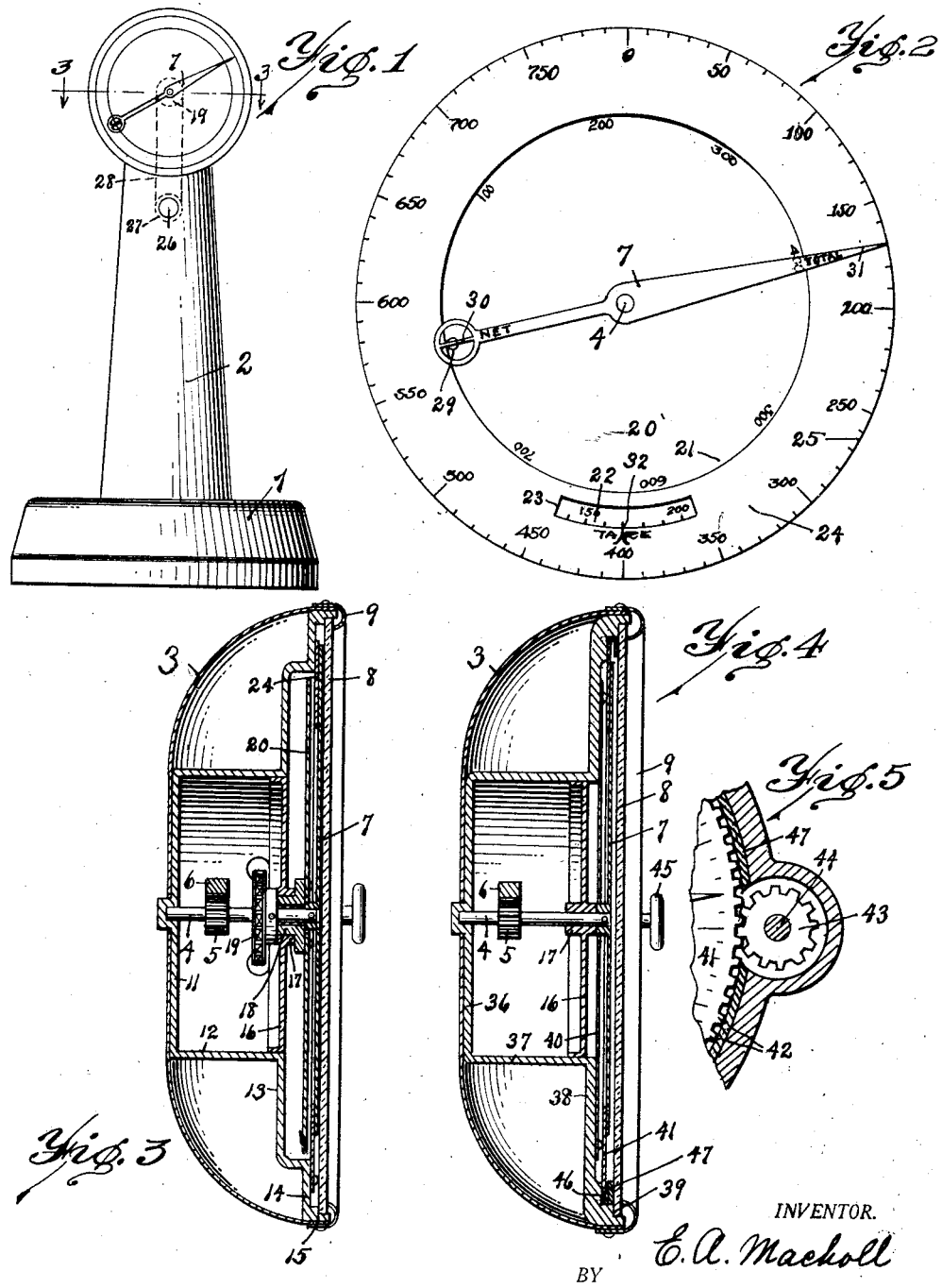

1,436,319

UNITED STATES PATENT OFFICE.

EDWARD A. MACHOLL, OF DETROIT, MICHIGAN.

NET-WEIGHT INDICATOR.

Application filed March 2, 1921. Serial No. 449,154.

*To all whom it may concern:*

Be it known that I, EDWARD A. MACHOLL, a citizen of the United States, and residing at Detroit, in the county of Wayne and State of Michigan, have invented a new and Improved Net-Weight Indicator, of which the following is a specification.

This invention relates to that class of scales in which a dial is provided with a circular ring of graduations to indicate weights and a pointer is rotatably mounted adjacent the dial, means being supplied to turn the pointer in proportion to the load on the scale, and its object is to provide means for subtracting a fixed and predetermined tare from each load and indicating the remainder or net weight and preferably also the gross weight and the tare at the same time.

In the moving of quarters of beef or carcasses of veal and lamb from the storage rooms to refrigerator cars, men sufficiently strong to carry the quarters or carcasses have been found to equal transportation machinery in speed and in cheapness, but hitherto an objectionable feature has always been the necessity of placing the meat on scale platforms and thereafter again lifting it onto the shoulders of the carriers. The present invention is intended to avoid this shifting of the load by providing a simple and effective device for weighing the carrier and his load and at the same time substracting the weight of the carrier.

This invention therefore consists of a pair of concentric scale dials graduated for weights and a pointer rotatable over said dials, one of the dials being graduated twice concentrically and in opposite directions.

It further consists in the details of construction illustrated in the accompanying drawing and particularly pointed out in the claims.

In the accompanying drawing, Fig. 1 is a front elevation of a scale embodying my improved tare dial. Fig. 2 is a front elevation of the dials and pointer of a scale embodying my invention. Fig. 3 is a section on the line 3—3 of Fig. 1 on a larger scale. Fig. 4 is a similar section showing a modified form of construction. Fig. 5 is a detail of the operating mechanism employed to shift the outer dial shown in Fig. 4.

Similar reference characters refer to like parts throughout the several views.

The base 1, pedestal 2, outer dial case 3, pointer shaft 4, pinion 5 thereon, rack bar 6, pointer 7, glass 8 and ring 9 to hold the glass 8 in position are all old and well known and are therefore merely indicated. I have shown no scale levers or connections as these form no part of the present invention and any desired system may be employed.

The inner case shown in Fig. 3 consists of the back 11, cylindrical body 12 and flanges 13, 14 and 15, the latter being stepped to receive the glass 8. A cross bar 16 is formed with a bearing 17 for the sleeve 18 wherein is the roller bearing for the pointer shaft 4. On the inner end of this sleeve is a sprocket wheel 19 and on the outer end is secured the rotatable tare dial 20 having an inner ring 21 of net-weight graduations and an outer ring 22 of tare graduations extending in the opposite direction from the net-weight graduations and visible through an opening 23 in the fixed annular outer or gross-weight dial 24 which has a ring 25 of weight graduations extending in the same direction as the net-weight graduations. This dial may be attached to the flange 14.

In Fig. 1 I have shown a knob 26 and indicated a sprocket wheel 27 connected thereto and a sprocket chain 28 extending around this wheel and the sprocket wheel 19 on the sleeve 18. Any other means may be employed to turn the net-weight dial.

The operation of the scale is as follows:—
When a scale is provided for each carrier, the carrier steps on the scale before beginning his work and the tare dial, which is also provided with "net" graduations, is turned by hand until its "zero" 29 is under the wire 30 at one end of the pointer 7. The opposite end 31 of the pointer now indicates the same "gross" weight as is shown at the point 32 at the middle of the tare opening. The movable tare dial is now left in its adjusted position, and when the carrier thereafter steps on the scale with a load, the net-weight will be read under the wire 30, the gross-weight, however, will be indicated by the opposite end 31 of the pointer. At intervals the carrier will check his "tare" in order to compensate for the loss of weight sustained because of the heavy work.

When a number of carriers use the same scale, each will remember his "tare" and call it to the clerk who will turn the net and tare dial 20 until this "tare" will be indicated by the pointer 32 at the opening or slot 23, whereupon he will record the net-weight indicated by the wire 30, and, if desired, the gross-weight indicated by the end 31.

It will be understood that the same proceedure may be followed with truckmen who will be weighed together with their empty trucks so that this "tare" may be taken into account at each weighing.

Instead of the inner dial being movable and the outer dial stationary, the arrangement may be reversed and the outer dial made movable while the inner dial is stationary, and the outer dial may be turned to indicate net-weights, a similar pointer 7 being employed, and in such case the gross-weights will be read under the wire 30, the net-weights at the opposite end 31, the tare through the opening 23 at the point 32, but the tare graduations will run in the same direction as the inner ring of graduations on the inner dial.

In Figs. 4 and 5 I have shown the dial case 3, ring 9 to hold the glass 8, pointer 7, pointer shaft 4, pinion 5 and rack bar 6 as before stated. The inner case consists of the back 36, shell 37 and flange 38 which is stepped at 39 to receive the glass 8. Attached to the flange 38 is the inner dial 40. The annular outer dial 41 may be of sheet metal and formed with teeth 42 which mesh with the pinion 43 on the shaft 44, to which may be attached the knob 45 by means of which the pinion 43 and dial may be turned.

The flange 38 is stepped at 46 to receive this dial which is held in position by a ring 47 of angle cross section if desired. The operation of this device is substantially the same as that above described.

The details and proportions of the various parts may be changed by those skilled in the art without departing from the spirit of my invention as set forth in the following claims.

I claim:—

1. An indicating mechanism for scales comprising a shaft which turns according to the weight on the scale, a pointer on the shaft, a stationary dial having a circular series of graduations to indicate gross-weights, a rotatable dial having a circular series of graduations to indicate net-weight and a second series of graduations to indicate tare, and means to rotate the second dial.

2. An indicating mechanism for scales comprising a shaft which turns according to the weight on the scale, a pointer on the shaft, a stationary dial having a circular series of graduations to indicate gross-weights, a rotatable dial having a circular series of graduations to indicate net-weight, and means to rotate the second dial, the beginning points of the two series of graduations being normally diametrically opposite each other and the two series co-operating with opposite ends of the pointer.

3. An indicating mechanism for scales comprising concentric dials, the outer being annular, one of them being movable, and a pointer rotatably mounted concentric with the dials, the outer dial having a slot and a circular series of graduations indicating weights, and the inner dial having two concentric circular series of graduations indicating weights, the outer graduations being visible through said slot.

4. An indicating mechanism for scales comprising concentric dials, the outer being annular, one of them being movable, and a pointer rotatably mounted concentric with the dials, the outer dial having a slot and a circular series of graduations indicating weights, and the inner dial having two concentric circular series of graduations indicating weights, the outer graduations being visible through said slot, the graduations on the inner dial being provided with figures which run in opposite directions.

5. An indicating mechanism for scales comprising a fixed annular dial having a circular ring of graduations and figures adjacent thereto to indicate weights, a rotatable inner dial and means to rotate the same, said inner dial having two concentric rings of graduations and figures adjacent each ring and running in opposite directions, a rotatable shaft concentric with said dials and graduations, and a pointer mounted on said shaft, the outer dial having a slot through which the outer graduations of the rotatable dial may be seen, the inner ring of the graduations of the movable dial being readable with one end of the pointer and the graduations on the outer dial being readable with the opposite end of the pointer.

EDWARD A. MACHOLL.